United States Patent [19]

Gras et al.

[11] Patent Number: 5,218,040
[45] Date of Patent: Jun. 8, 1993

[54] LIGHT-STABILE, REACTIVE TWO-COMPONENT PUR PAINTS WHICH CURE AT ROOM TEMPERATURE

[75] Inventors: Rainer Gras, Bochum; Elmar Wolf, Recklinghausen, both of Fed. Rep. of Germany

[73] Assignee: Huels Aktiengesellschaft, Marl, Fed. Rep. of Germany

[21] Appl. No.: 751,524

[22] Filed: Aug. 29, 1991

[30] Foreign Application Priority Data

Sep. 6, 1990 [DE] Fed. Rep. of Germany ....... 4028284

[51] Int. Cl.$^5$ .................... C08J 3/00; C08K 5/3435; C08L 75/00; C08G 18/81
[52] U.S. Cl. .................... 524/589; 524/590; 528/45; 528/50; 528/53; 528/54; 528/62; 528/64; 528/73; 528/74
[58] Field of Search .............. 524/589, 590; 528/45, 528/50, 53, 54, 62, 64, 73, 74

[56] References Cited

U.S. PATENT DOCUMENTS

| | | | |
|---|---|---|---|
| 4,243,792 | 1/1981 | Short | 528/73 |
| 4,495,229 | 1/1985 | Wolf et al. | 528/45 |
| 4,569,997 | 2/1986 | Karrer | 544/100 |

*Primary Examiner*—Paul R. Michl
*Assistant Examiner*—Patrick Niland
*Attorney, Agent, or Firm*—Oblon, Spivak, McClelland, Maier & Neustadt

[57] ABSTRACT

The invention relates to light-stabile, reactive two-component PUR paints which cure at room temperature and are comprised of:

a) isocyanate prepolymers blocked with certain sterically hindered piperidine derivatives; and b) (cyclo)aliphatic polyamines and/or aminoamides;

wherewith 1-1.4 blocked NCO groups are brought to reaction per amino group.

7 Claims, No Drawings

LIGHT-STABILE, REACTIVE TWO-COMPONENT PUR PAINTS WHICH CURE AT ROOM TEMPERATURE

BACKGROUND OF THE INVENTION

Field of the Invention

The present invention relates to novel light-stable 2-component PUR paints based on blocked (cyclo)aliphatic polyisocyanates and polyamines, which paints cure at room temperature.

Description of the Background

It is known that polyamines react so rapidly with polyisocyanates that they are not processible in the manufacture of duroplastic polyurethane (PUR) resin compounds. On the other hand, diamines may be reacted with diisocyanates to form thermoplastic PUR compounds, either in solution or in the melt, without problems. In the latter thermoplastically processible PUR systems, the properties of the PUR elastomers, particularly impact strength, crack propagation resistance, and tensile strength, may be improved by introducing urea segments.

Thus it is not possible to produce crosslinked PUR systems by, e.g., reaction of a diamine with a triisocyanate or reaction of a triamine with a diisocyanate.

Ger. OS 10 86 372 proposes coatings and reactive coatings which can be produced at room temperature by reaction of a phenol-blocked aromatic triisocyanate and an amide-group-containing diamine:

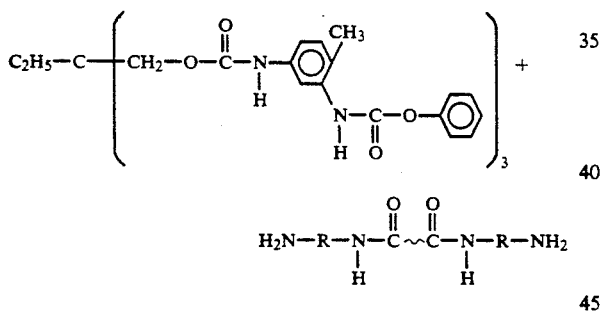

where R is an alkylene group.

A prerequisite for the technique described, which is the reduction of the NCO reactivity toward $NH_2$ groups by blocking of the NCO groups, is that the blocking agent not be bound too strongly to be displaced by amines at room temperature. This prerequisite is satisfied by the use of phenol as a blocking agent. At the 1980 Fatipec Congress (Book II therefrom, pp. 293-306), flexible crosslinked PUR elastomers were proposed which were produced by the same technique, i.e., the reduction of NCO activity by blocking. In preparing these elastomers, a nonylphenolblocked isocyanate adduct (obtained from 1 mol polypropylene ether triol and 3 mol toluylenediisocyanate) was reacted with a diamine, e.g., Laromin®C 260 (3,3'-dimethyl-4,4'diaminodicyclohexylmethane, supplied by BASF) at room temperature, with the ratio $NCO : NH_2 = 1:1$.

Both PUR systems crosslinked by an $NCO/NH_2$ reaction have the disadvantage that they are not light-resistant, in that they are comprised of aromatic PURS, which are well known to be subject to discoloration when exposed to weathering. This disadvantage of the described aromatic PUR systems cannot be eliminated by simple substitution of a (cyclo)aliphatic isocyanate for the aromatic isocyanate ((cyclo)aliphatic PURs have excellent light stability), because phenol-blocked (cyclo)aliphatic NCO groups do not, or do not sufficiently react with amines at room temperature.

A need therefore continues to exist for a blocked polyisocyanate which is suitable for producing light-stabile 2-component PUR paints which cure at room temperature by means of an $NCO/NH_2$ reaction.

SUMMARY OF THE INVENTION

Accordingly, one object of the present invention is to provide a special piperidine derivative as a blocking agent for NCO prepolymers which are to be reacted with polyamines, in which (cyclo)aliphatic isocyanates ar employed as the basis of the NCO prepolymers.

Briefly, this object and other objects of the present invention as hereinafter will become more readily apparent can be attained by a light-stabile, reactive 2-component PUR paint which cures at room temperature and is comprised of:

a) isocyanate prepolymers blocked with piperidine derivatives having the following general formulas:

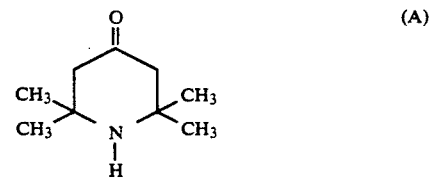
(A)

or

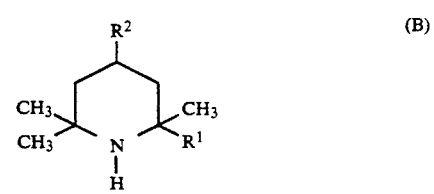
(B)

where
$R^1 = H, CH_3$;

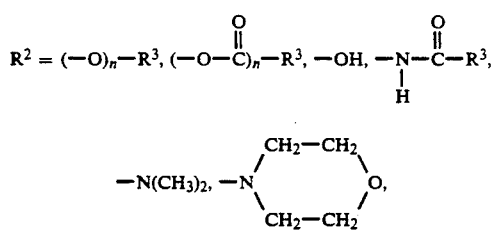

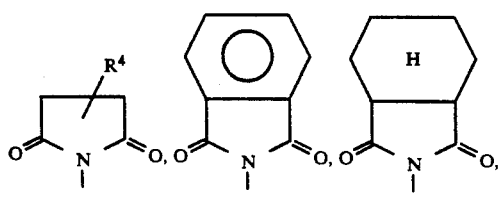

n=1,2
$R^3$ represents an alkyl group with 1-18 C atoms, when n=1, or an alkylene group with 2-18 C atoms, when n=2; and $R^4$ represents H, or an alkyl group with 1-20 C atoms; and b) (cyclo)aliphatic polyamin wherewith 1-1.4 blocked NCO groups are reacted per amino group of the polyamine reactant.

DETAILED DESCRIPTION OF THE PREFERRED EMBODIMENTS

It is essential for the piperdine derivatives, which are to be used as blocking agents, that the secondary ring amino group be surrounded by at least three $CH_3$ groups in the alpha position. Thus, for example, 2,2,6-trimethylpiperidine is suitable for preparing the present compounds, whereas 2,6-dimethylpiperldine is not a candidate for blocking of NCO prepolymers in this invention. Sterically hindered amines are known as blocking agents for isocyanates. They have been described as blocking agents for preparing 1-component PUR baking enamels based on polyisocyanates and hydroxyl-containing polyesters (Ger. OS 32 21 558). However, it has not been known in the past to prepare reactive, light-stabile 2-component PUR paints based on (cyclo)aliphatic polyisocyanates and polyamines, which paints cure at room temperature. All previously known 2-component PUR systems based on blocked (cyclo)aliphatic polyisocyanates and polyamines have required heat for curing, as described in, e.g., Ger. OSs 29 02 090, 31 20 596, and 32 39 000. The present blocked polyisocyanates are compounds with a blocked NCO content of 2-12%, preferably 5-8%, and a molecular weight c. 500-5,000, preferably 2,000-3,000. The isocyanate prepolymers based on polyester polyols must be processed in solution, but those based on polyether polyols may be processed without solvents.

The blocked polyisocyanates are prepared in two steps: In the first step the NCO prepolymer is prepared in known fashion from polyester polyols or polyether polyols and (cyclo)aliphatic diisocyanates, with the equivalent ratio of NCO to OH being 2:1. In the second step the piperidine derivative is added portion wise to the NCO prepolymer heated to 60°-100° C. wherewith 1 equivalent of NH is brought to reaction per equivalent of NCO. In many cases it has been found advantageous to bring greater than 1 NH-equivalent of piperidine derivative to reaction, preferably, 1.2-1.4 NH-equivalents, per 1 equivalent of NCO. The reaction components are heated at 60°-100° C. until the NCO content of the reaction mixture is less than 0.3%. Candidates for use as the (cyclo)aliphatic diisocyanates for the inventive paints include any (cyclo)aliphatic diisocyanate. In practice, isophoronediisocyanate (IPDI) and 1,6-hexanediisocyanate are preferred. The diisocyanates may be used in dimeric or trimeric form, as uretdiones, isocyanurates, carbodiimides, ureas, and/or biurets.

The polyester polyols used in preparing the NCO prepolymers are condensation products of dicarboxylic acids and polyols, which products are produced by polycondensation of, e.g., adipic acid, trimethyladipic acid, phthalic acid, isophthalic acid, or terephthalic acid, with ethylene glycol, butanediol, diethylene glycol, triethylene glycol, hexanediol, neopentyl glycol, or 1,1,1-tri-hydroxymethyl-propane (TMP). Further, the polyester polyols may also be polymerization products of caprolactone. Also, OH-group-containing polymerization products are used to prepare the NCO prepolymers. These are, e.g., polyalkylene ether polyols, produced as starter components by anionic polymerization, copolymerization, and block copolymerization, of ethylene oxides, e.g., ethylene oxide, propylene oxide, or butylene oxide, with bi- or polyfunctional alcohols, e.g., butanediol, 1,1,1-tri-hydroxymethylpropane, 1,2,6-hexanetriol, or pentaerythritol, or with amines, e.g., methylamine or ethylenediamine, as starter components. The polyols may also be prepared by anionic polymerization and copolymerization of cyclic ethers, e.g., tetrahydrofuran, ethylene oxide, or propylene oxide with an acid catalyst, e.g., boron trifluoride etherate. The following piperidine derivatives are particularly well suited for use as blocking agents: 2,2,4,6tetramethylpiperidine, and condensation products involving 2,2,6,6-tetramethylpiperidine, in particular, condensation products of 4-hydroxy-2,2,6,6-tetramethylpiperidine and monocarboxylic acids having at least 6 C atoms, or condensation products of 4-amino-2,2,6,6-tetramethylpiperidine and monocarboxylic acids having at least 6 C atoms.

The known representatives of 2-component PUR paints based on (cyclo)aliphatic isocyanates are the so-called "DD paints", which are generally used where high performance paints are required. These paints take too long to cure at room temperature. Therefore, when used in industry, the curing is forced, e.g., about 80°-120° C. for 20-30 min. The present 2-component PUR paints do fully cure in a very short time; e.g., they form dust-dry films in 20 min. The most important candidates, as NCO components of the 2-component PUR paints, are blocked polyisocyanates wherein a (cyclo)aliphatic diisocyanate is reacted with a polyester polyol in an equivalent ratio of NCO : OH of 2:1. In general, candidates for use as the polyamine components include any diamines, but particularly isophoronediamine (IPD), 2,2,4- and/or 2,4,4-trimethylhexanediamine (TMD), and Laromin® C 260. Other suitable amines are ethylenediamine, hexanediamine, 1,3-and/or 1,2-propanediamine, neopentanediamine, 4,4'-diaminodicyclohexylmethane, 4,9-dioxadodecane-1,12-diamine, diethylenetriamine, and dipropylenetriamine. The polyamine may also be an aminoamide, prepared in known fashion by condensation of a diamine with a dicarboxylic acid in a molar ratio of (n+1):n, where n may be 1-4.

To produce the inventive 2-component PUR coatings, the components, i.e., the blocked polyisocyanate and the (cyclo)aliphatic polyamine, are mixed in a ratio of NCO : $NH_2$ of 1-1.4:1, possibly in inert solvents such as toluene, xylene, ethylene glycol acetate, or methoxypropyl acetate, and possibly with pigments, and the mixture is applied in known fashion on cleaned and pretreated sheets, plates, or panels, and is cured at room temperature. The resulting paint films have the excellent paint properties which are well known to be associated with 2-component PUR paints.

Having now fully described the invention, it will be apparent to one of ordinary skill in the art that many changes and modifications can be made thereto without departing from the spirit or scope of the invention as set forth herein.

A I. General manufacturing method for the isocyanate prepolymers of the invention The blocked NCO prepolymers are produced in two steps. In the first step, the NCO prepolymers are produced by reaction of the polyol with the diisocyanate, with an OH : NCO ratio 1:1.8-2.5, preferably 1:2, wherewith the components are heated together at 80°

C. until the NCO content reaches the intended value. Thereafter, in the second step, the tetramethylpiperidine derivative is added at 80° C. After the addition of the blocking agent has been concluded, the reaction mixture is heated further at 80° C. until the NCO content is less than 0.3%.

B. Manufacture of the 2-component PUR Paints

I. Manufacture of the blocked isocyanate prepolymers of the invention:

EXAMPLE 1

540 parts by weight (pbw) of a polyester containing OH end groups, which polyester was prepared from 1 mol trimethylolpropane (TMP), 6 mol hexanediol, 5 mol phthalic acid anhydride, and 1 mol adipic acid, and had OH number 101–104 mg KOH/g, was heated at 80° C. with 222 pbw IPDI in 326 pbw butyl acetate / Solvesso®100 (ratio 2:1 wt.) until the NCO content of the reaction mixture was c. 3.8%. Thereafter 141 pbw 2,2,4,6-tetramethylpiperidine was added portion wise and the mixture was heated further at 80° C. until the NCO content was less than 0.3%. The viscosity of the reaction product was 57,000 mPa-sec at 25° C.

Example 2:

249 pbw of a polyester containing OH end groups, which polyester was prepared from 2 mol TMP, 5 mol hexanediol, 3 mol phthalic anhydride, and 2 mol adipic acid, and had an OH number 225–229 mg KOH/g, was heated at 80° C. with 222 pbw IPDI in 202 pbw butyl acetate / Solvesso(R) 100 until the NCO content of the reaction mixture was 6.2%. Thereafter, 141 pbw 2,2,6,6-tetramethylpiperidine was added portion wise and the mixture was heated further at 80° C. until the NCO content was less than 0.3%. The viscosity of the reaction product was 180,000 mPa-sec at 25° C.

Example 3:

195 pbw of trimeric 1,6-hexanediisocyanate (isocyanurate of 1,6-hexanediisocyanate) was reacted with 155 pbw triacetonamine, which is 2,2,6,6-tetramethyl-4-piperidinone, in a mixture of 146 pbw Solvesso®100 and 87 pbw butyl acetate, in the manner of Example 1. The reaction had viscosity 870 mPa-sec at 25° C., and a blocked NCO content of 7.2%.

II. Manufacture of the 2-component PUR paints

The blocked NCO prepolymers were mixed with the diamine in an equivalence ratio of 1:1. After a ripening time of c. 10 min, the mixtures were applied to degreased steel plates and cured at room temperature. The results are shown in the Table below.

TABLE

Composition of the 2-Component PUR Paint

| | Composition of the 2-component PUR paint | | Storage time without de-mixing (minutes) | Layer thickness (microns) | Koenig hardness after 1 da (seconds) (DIN 53 157) | Same, after 3 da | Same, after 7 da | Grid-cutting test (DIN 53 151) | Erichsen cupping test (mm) (DIN 53 156) | Impact reversal (g-m) |
|---|---|---|---|---|---|---|---|---|---|---|
| Example | Blocked isocyanate prepolymer | Amine | | | | | | | | |
| 1 | I.1 (Δ NCO-prepolymer with 3.8% NCO blocked with | IPD | ca.50 | 50–80 | 30 | 38 | 43 | 2 | >10 | >944.6 |
| Ex. 1a, comparison example, with paint comprised essentially of an NCO prepolymer with 3.8% NCO content, and without the 2,2,4,6-tetramethylpiperidine | (ΔNCO-prepolymer with 3.8% NCO and without 2,2,4,6-tetramethylpiperidine | IPD | Formed a gel, and was not processible | | | | | | | |
| 2 | I.1 | TMD | ca.45' | 50–90 | 15 | 19 | 27 | 0 | >10 | >944.6 |
| 3 | I.1 | LAROMIN C 260 | ca.60 | 50–70 | 42 | 46 | 50 | 0 | >10 | >944.6 |
| 4 | I.3 | IPD | ca.25 | 75–90 | 14 | 28 | 29 | 0 | >10 | >944.6 |
| 5 | I.3 | TMD | ca.18 | 60–80 | 10 | 11 | 14 | 0 | >10 | >944.6 |
| 6 | I.3 | LAROMIN C 260 | ca.30 | 50–75 | 20 | 38 | 41 | 0 | >10 | >944.6 |

IPD: Isophoronediamine
TMD: 2,2,4/2,4,4-Trimethylhexamethylenediamine (TMD and IPD are commercial products obtained from Hüls AG)
Laromin ® C 260: 3,3'-Dimethyl-4,4'-diaminodicyclohexylmethane (obtained from BASF AG)
Solvesso ® 100: An aromatic mixture having boiling limits of 163–181° C.
Blocked isocyanate prepolymer and amine are mixed in the equivalent ration of NCO (blocked): NH$_2$ of 1:1.

Having now fully described the invention, it will be apparent to one of ordinary skill in the art that many changes and modifications can be made thereto without departing from the spirit or scope of the invention as set forth herein.

What is claimed as new and desired to be secure by Letters Patent of the United States is:

1. A reactive 2-component polyurethane resin paint which cures at room temperature comprising:
   a) isocyanate prepolymers blocked with a piperidine derivative selected from the group consisting of derivatives having the following formulas:

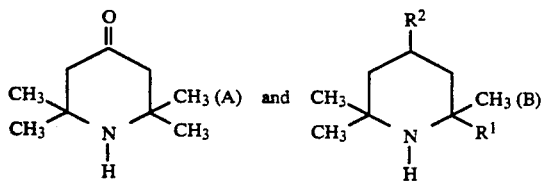

wherein
R¹ = H, CH₃;

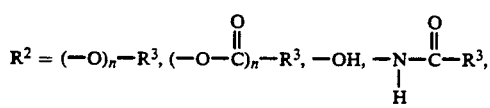

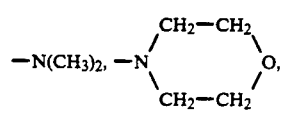

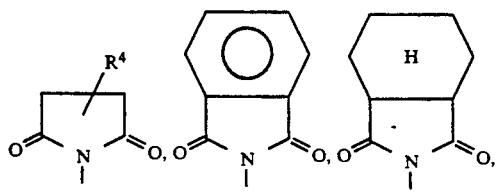

and n = 1 or 2 with the proviso that R³ represents an alkyl group with 1-18 C atoms, when n=1, and R³ represents an alkylene group with 2-18 C atoms, when n=2; and R⁴ represents H, or an alkyl group with 1-20 C atoms; and b) (cyclo) aliphatic polyamines, aminoamides or combinations thereof;

in which 1-1.4 blocked NCO groups react per amino group of the polyamine reactant.

2. The two-component polyurethane resin paint of claim 1; wherein the (cyclo)aliphatic diisocyanate is isophoronediisocyanate (IPDI) or 1-6-hexanediisocyanate.

3. The two component polyurethane resin paint of claim 1 isocyanate prepolymer is prepared by reacting a polyester polyol or polyether polyol with a (cyclo)aliphatic diisocyanate with an equivalent ratio of NCO to OH being 2:1.

4. The two component polyurethane resin paint of claim 3, wherein the polyester polyol is prepared by the reaction of a dicarboxylic acid and a polyol.

5. The two component polyurethane resin paint of claim 1, wherein the blocked polyisocyanate has a blocked NCO content of 2-12% and a molecular weight of 500-5,000.

6. The two component polyurethane resin paint of claim 5, wherein said blocked NCOP content is 5-8% and the molecular weight is 2000-3000.

7. The two component polyurethane resin paint of claim 1, wherein the piperidine blocking agent is added to the NCO prepolymer heated to 60°-100° C. where one equivalent of the NH radical is reacted per equivalent of NCO group.

* * * * *